(12) United States Patent
Hirai (10) Patent No.: US 7,349,671 B2
(45) Date of Patent: Mar. 25, 2008

(54) FOLDING MOBILE TELEPHONE APPARATUS

(75) Inventor: Koutaro Hirai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 491 days.

(21) Appl. No.: 10/536,698

(22) PCT Filed: Nov. 25, 2003

(86) PCT No.: PCT/JP03/15023

§ 371 (c)(1), (2), (4) Date: May 27, 2005

(87) PCT Pub. No.: WO2004/057840

PCT Pub. Date: Jul. 8, 2004

(65) Prior Publication Data

US 2006/0063562 A1    Mar. 23, 2006

(30) Foreign Application Priority Data

Dec. 20, 2002    (JP) .............................. 2002-370356

(51) Int. Cl.
*H04M 1/00* (2006.01)

(52) U.S. Cl. .................. 455/73; 455/556.1; 455/575.3; 455/90.3; 340/14.02

(58) Field of Classification Search ............... 455/90.3, 455/552.1, 556.1–559, 575.1, 575.3; 348/14.01–14.02
See application file for complete search history.

(56) References Cited

U.S. PATENT DOCUMENTS 7,283,854 B2 * 10/2007 Sato et al. ............... 455/575.3

| | | | | |
|---|---|---|---|---|
| 2002/0077145 A1 * | 6/2002 | Kamiya et al. | ............. | 455/550 |
| 2003/0036365 A1 * | 2/2003 | Kuroda | ......................... | 455/90 |
| 2003/0040346 A1 * | 2/2003 | Fukuda et al. | .............. | 455/575 |
| 2005/0245288 A1 * | 11/2005 | Priestman et al. | ....... | 455/569.1 |

FOREIGN PATENT DOCUMENTS

| | | |
|---|---|---|
| JP | 2000-353036 | 12/2000 |
| JP | 2001-320622 | 11/2001 |
| JP | 2002-261880 | 9/2002 |
| JP | 2003-188960 | 7/2003 |
| JP | 2003-244295 | 8/2003 |
| JP | 2003-333141 | 11/2003 |
| JP | 2004-7218 | 1/2004 |
| WO | 03/053027 | 6/2003 |

* cited by examiner

*Primary Examiner*—Simon Nguyen
(74) *Attorney, Agent, or Firm*—Pearne & Gordon LLP

(57) ABSTRACT

The subject of the present invention is to prevent an influence of a radiation noise generated in the image processing upon the transmission/reception of the radio communicating unit in a folding cellular phone device equipped with a camera. A radio communicating unit, an overall controlling unit, and a first storing unit are provided to a first casing, and a camera portion, an image processing controlling unit, a displaying unit, and a second storing unit are provided to a second casing, and then processing of image data picked up by the camera portion is controlled by the image processing controlling unit. Thus, the image data never communicate between the first casing and the second casing. Also, the image data are transferred from the second storing unit in the second casing to the first storing unit in the first casing when the radio communication is not carried out, and the image data are transmitted via a radio after the transfer. Thus, the electromagnetic wave is never radiated from the flexible board that connects the first casing and the second casing.

3 Claims, 8 Drawing Sheets

FOLDING MOBILE TELEPHONE APPARATUS

TECHNICAL FIELD

The present invention relates to a folding cellular phone device into which a camera using a solid state imaging device such as a CCD camera, a CMOS camera, or the like is incorporated.

BACKGROUND ART

Recently the CCD camera, the CMOS camera, or the like makes progress in miniaturization, and the cellular phone device with a camera into which such camera is incorporated as a camera portion is put into practical use. However, when the camera portion and an image processing unit that executes the massive image processing at a high speed are added to a configuration of the folding cellular phone device, the radiation noise is radiated from the cable that transmits image data. Thus, the bit error and the frame error are increased in the received data of the radio communicating unit in the cellular phone device.

Therefore, such an approach is employed that a generation source of an electromagnetic wave is surrounded by an electromagnetic shielding frame member to prevent the electromagnetic wave from reaching the electronic circuit board from the generation source of the electromagnetic wave (for example, Patent Literature 1). In this case, in the folding cellular phone device, there existed the problem such that the flexible board for connecting a first casing and a second casing that is opened/closed cannot be sufficiently surrounded by the electromagnetic shielding frame member.

Figure 7:
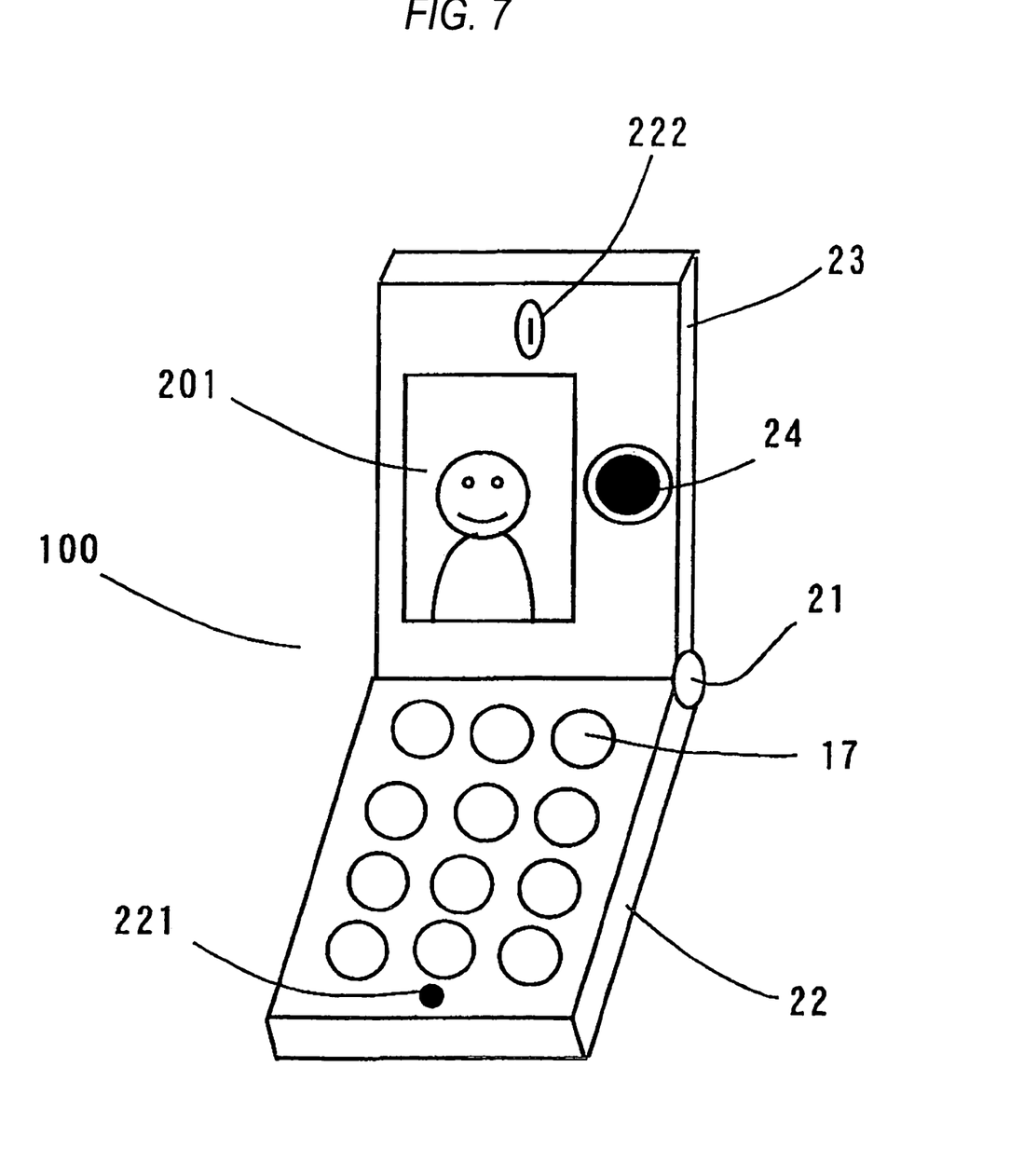
FIG. 7 is an external appearance view of a folding cellular phone device in the prior art.

FIG. 7 is an external appearance view of a folding cellular phone device 100 in the prior art. This folding cellular phone device 100 supports a second casing 23 on a first casing 22 to be opened/closed on a hinge 21. A key operating portion 17 and a microphone 221 serving as a mouthpiece are provided to the first casing 22. A displaying unit 201, a camera portion 24, and a receiver 222 serving as an earpiece are provided to the second casing 23.

Figure 8:
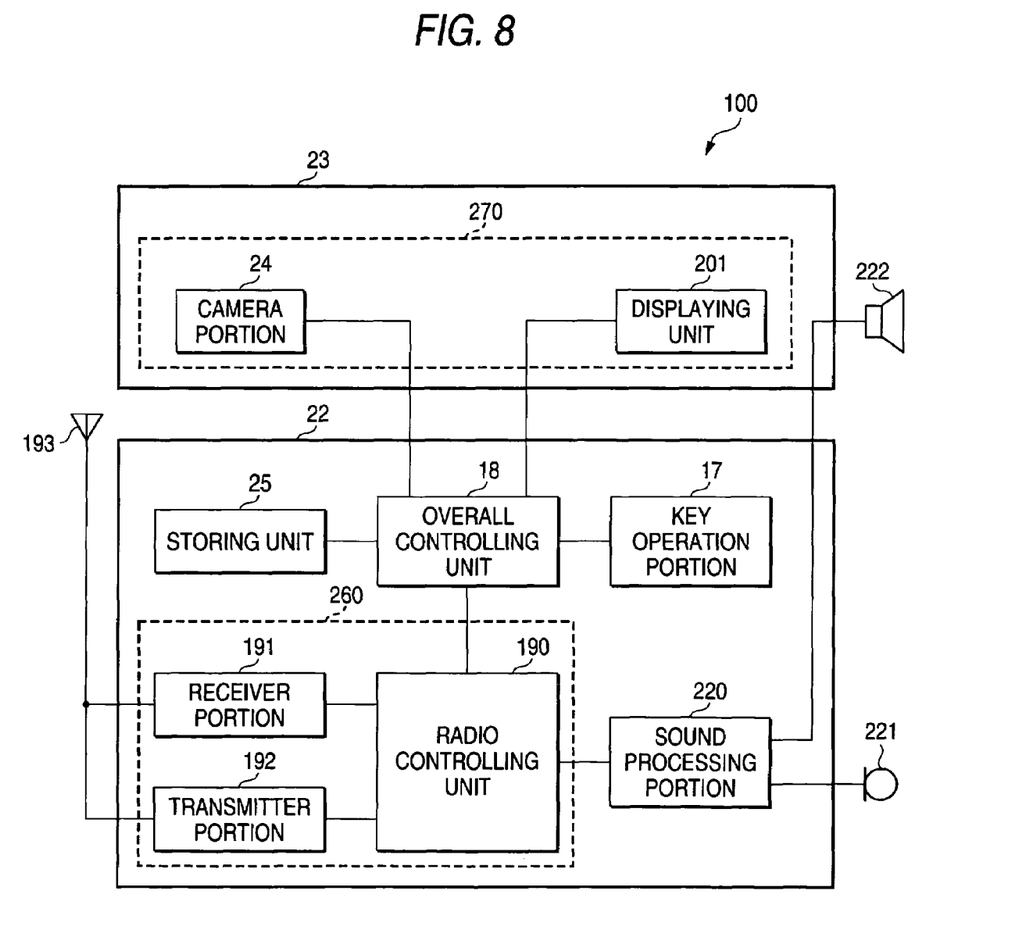
FIG. 8 is a schematic block diagram of the folding cellular phone device in the prior art.

A schematic block diagram of the folding cellular phone device 100 in the prior art is shown in FIG. 8. In FIG. 8, the first casing 22 and the second casing 23 are indicated by a broken line. A receiver portion 191, a transmitter portion 192, and a radio controlling unit 190 are provided to the first casing 22, and an antenna 193 is projected from the first casing 22. The receiver portion 191 and the transmitter portion 192 receive/transmit the radio signal via the antenna 193 the under control of the radio controlling unit 190 to execute a radio communication with other cellular phone device vi a base station (not shown). The radio controlling unit 190 is connected to a sound processing portion 220 to convert the received signal into a sound signal and output it to the receiver 222. Also, the sound processing portion 220 encodes the sound being input into the microphone 221 and sends out the sound signal via the radio controlling unit 190, the transmitter portion 192, and the antenna 193. The receiver portion 191, the transmitter portion 192, and the radio controlling unit 190 constituting a radio communicating unit 19 are surrounded and shielded by an electromagnetic shielding frame member 260 to prevent the influence of the electromagnetic wave radiated from other portions. The radio controlling unit 190 is connected to a overall controlling unit 18 that executes the overall control of the folding cellular phone device 100. The key operating portion 17 and a storing unit 25 are connected to the overall controlling unit 18. The operator of the folding cellular phone device 100 inputs desired signals such as a phone number, and the like via key operating portion 17 to use the folding cellular phone device 100. The storing unit 25 stores phone number data in an electronic phone book, control programs, control data, and image data picked up by the camera portion 24.

The camera portion 24 composed of the CCD camera or the CMOS camera, the displaying unit 201 composed of the color liquid crystal display device, and the receiver 222 are provided to the second casing 23. The camera portion 24 and the displaying unit 201 are surrounded by an electromagnetic shielding frame member 270 not to radiate the electromagnetic wave. The camera portion 24, the displaying unit 201, and the receiver 222 are connected to the overall controlling unit 18 or the sound processing portion 220 in the first casing 22 via the flexible board that permits the folding operation. In this case, since an opening/shutting range of almost 180 degree is required of a foldable portion at which the flexible board is folded up, it is difficult to surround such portion by the electromagnetic shielding frame member. As a result, such portion was not surrounded by the electromagnetic shielding frame member.

In the folding cellular phone device 100 in the prior art, the overall controlling unit 18 also controls the camera portion 24 and the displaying unit 201. When a camera mode starting signal is input into the key operating portion 17, the overall controlling unit 18 supplies a power to the camera portion 24 from a rechargeable battery (not shown) and starts an operation in the camera mode. Here, the camera mode signifies an operation mode in which a power is supplied to the camera portion 24, the image data being now picked up by the camera portion 24 are processed by the overall controlling unit 18, the monitor image is displayed on the displaying unit 201, the image data obtained when the shutter button is pressed is captured on the overall controlling unit 18 when the shutter button of the key operating portion 17 is pressed during the display of the monitor image, the image data that are subjected to the image processing are stored in the storing unit 25, and the stored image is displayed on the displaying unit 201 as the picked-up image.

Since the image data are transferred between the camera portion 24 and the overall controlling unit 18 and between the overall controlling unit 18 and the displaying unit 201 during the operation in the camera mode, the electromagnetic wave is radiated from the flexible board that is not surrounded by the electromagnetic shielding frame member. Also, when processes of reading the image data from the storing unit 25 to display, then processing the data, and then storing the data again in the storing unit 25 are carried out in modes other than the operation in the camera mode, the image data communicate between the overall controlling unit 18 and the displaying unit 201. Thus, the electromagnetic wave is radiated from the flexible board that is not covered with the electromagnetic shielding frame member.

(Patent Literature 1) JP-A-2001-320622 (Page 4, FIG. 4)

The approach of surrounding the generation source of the electromagnetic wave by the electromagnetic shielding frame member is effective in the so-called straight-type cellular phone device, in which the electronic circuit board and the electronic parts are incorporated into a single casing, since the electronic circuit board, the electronic parts, and cables used to connect them can be surrounded by the electromagnetic shielding frame member. However, as described above, in the folding cellular phone device, there existed the problem such that the opening/shutting portion cannot be surrounded by the electromagnetic shielding frame member and thus the electromagnetic wave cannot be sufficiently shielded.

It is an object of the present invention to provide a folding cellular phone device constructed such that an electromagnetic wave acting as the noise is not radiated from an opening/shutting portion.

DISCLOSURE OF THE INVENTION

In order to overcome the above problem, in the present invention, the radio communicating unit and the overall controlling unit are provided to the first casing, and the camera portion, the image processing controlling unit, the displaying unit, and the storing unit are provided to the second casing, and the image data picked up by the camera portion are processed by the image processing controlling unit.

According to the above configuration, there can be achieved such an advantage that, even though the image data are being processed, such image data never communicate between the first casing and the second casing and thus the electromagnetic wave is never radiated from the flexible board that connects the first casing and the second casing.

Also, in the present invention, the first storing unit is provided to the first casing, the second storing unit is provided to the second casing, the data necessary for the radio communication are transferred between the first-storing unit and the second storing unit when the radio communication is not carried out, and the radio communication is executed by reading the necessary data from the first storing unit when the radio communication is carried out.

According to this, there can be achieved such an advantage that, even though the radio communication with the image data is being executed, such image data never communicate between the first casing and the second casing and thus the generation of the electromagnetic wave can be reduced.

In Figures, a reference symbol 16 is a flexible board, 17 key operating portion, 18 overall controlling unit, 19 radio communicating unit, 22 first casing, 23 second casing, 24 camera portion, 25 storing unit, 190 radio controlling unit, 191 receiver portion, 192 transmitter portion, 193 antenna, 201 displaying unit, 220 sound processing portion, 260 electromagnetic shielding frame member, 221 microphone, 222 receiver, 241 image processing controlling unit, 251 first storing unit, 252 second storing unit, 270 electromagnetic shielding frame member, and 280 electromagnetic shielding frame member.

BEST MODE FOR CARRYING OUT THE INVENTION

The present invention employs such a configuration of a folding cellular phone device, in which a second casing is supported on a first casing to be opened/closed, that a radio communicating unit and an overall controlling unit are provided to the first casing, a camera portion, an image processing controlling unit, a displaying unit, and a storing unit are provided to the second casing, the image processing controlling unit and the storing unit are connected to the overall controlling unit, the camera portion, the displaying unit, and the storing unit are connected to the image processing controlling unit, and image data picked up by the camera portion are processed by the image processing controlling unit.

According to this configuration, the processing of the image data picked up by the camera portion is performed only in the second casing. Therefore, the radio communicating unit in the first casing is by no unit affected by the electromagnetic wave.

Also, the present invention employs such a configuration of a folding cellular phone device, in which a second casing is supported on a first casing to be opened/closed, that a radio communicating unit, an overall controlling unit, and a first storing unit are provided to the first casing, a camera portion, an image processing controlling unit, a displaying unit, and a second storing unit are provided to the second casing, the image processing controlling unit, the first storing unit, and the second storing unit are connected to the overall controlling unit, the camera portion, the displaying unit, and the second storing unit are connected to the image processing controlling unit, and image data picked up by the camera portion are processed by the image processing controlling unit.

According to this configuration, the radiation noise generated by the image data processing executed in the second casing does not have the influence upon the radio communicating unit provided to the first casing.

In addition, the present invention employs such a configuration that data necessary for a radio communication are transferred between the first storing unit and the second storing unit when the radio communication is not carried out, and the radio communication is executed by reading necessary data from the first storing unit when the radio communication is carried out.

According to this configuration, even when the radio communication containing the image data is executed, the image data do not communicate between the first casing and the second casing.

Embodiments of the present invention will be explained with reference to the drawings hereinafter.

Embodiment 1

Figure 1:
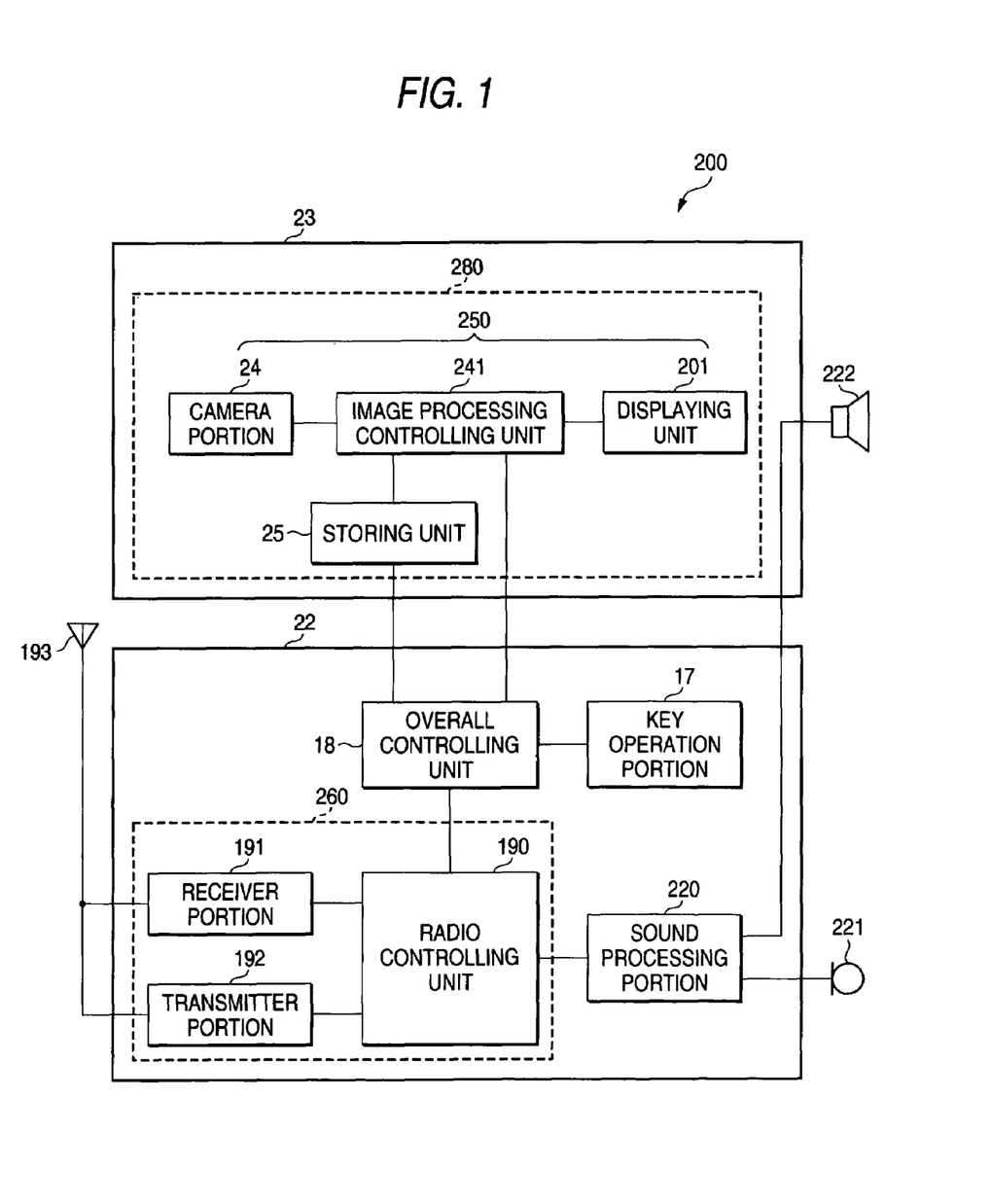
FIG. 1 is a schematic block diagram of a folding cellular phone device according to a first embodiment of the present invention.

FIG. 1 is a schematic block diagram of a folding cellular phone device 200 according to a first embodiment of the present invention. Since a configuration of the folding cellular phone device 200 is basically similar to that of the folding cellular phone device 100 in the prior art explained in FIG. 8, the same reference numerals are affixed to the common portions and their explanation will be omitted herein.

In FIG. 1, the storing unit 25 is not provided to the first casing 22 but to the second casing 23. Then, an image processing controlling unit 241 is provided to the second casing 23 and is connected to the camera portion 24, the displaying unit 201, and the storing unit 25. The image processing controlling unit 241 constitutes one camera module together with the camera portion 24, the displaying unit 201, and the storing unit 25 and executes a series of operations in the camera mode. Also, even when the image processing controlling unit 241 is not executing the operation in the camera mode, such unit executes mainly the search control of the electronic phone book, the control in connection with the image display such as the standby screen, the call-incoming screen, etc. in the second casing 23 under overall control of the overall controlling unit 18. Also, the camera portion 24, the image processing controlling unit 241, the displaying unit 201, and the storing unit 25 are covered with an electromagnetic shielding frame member 280 to shield.

Figure 2:
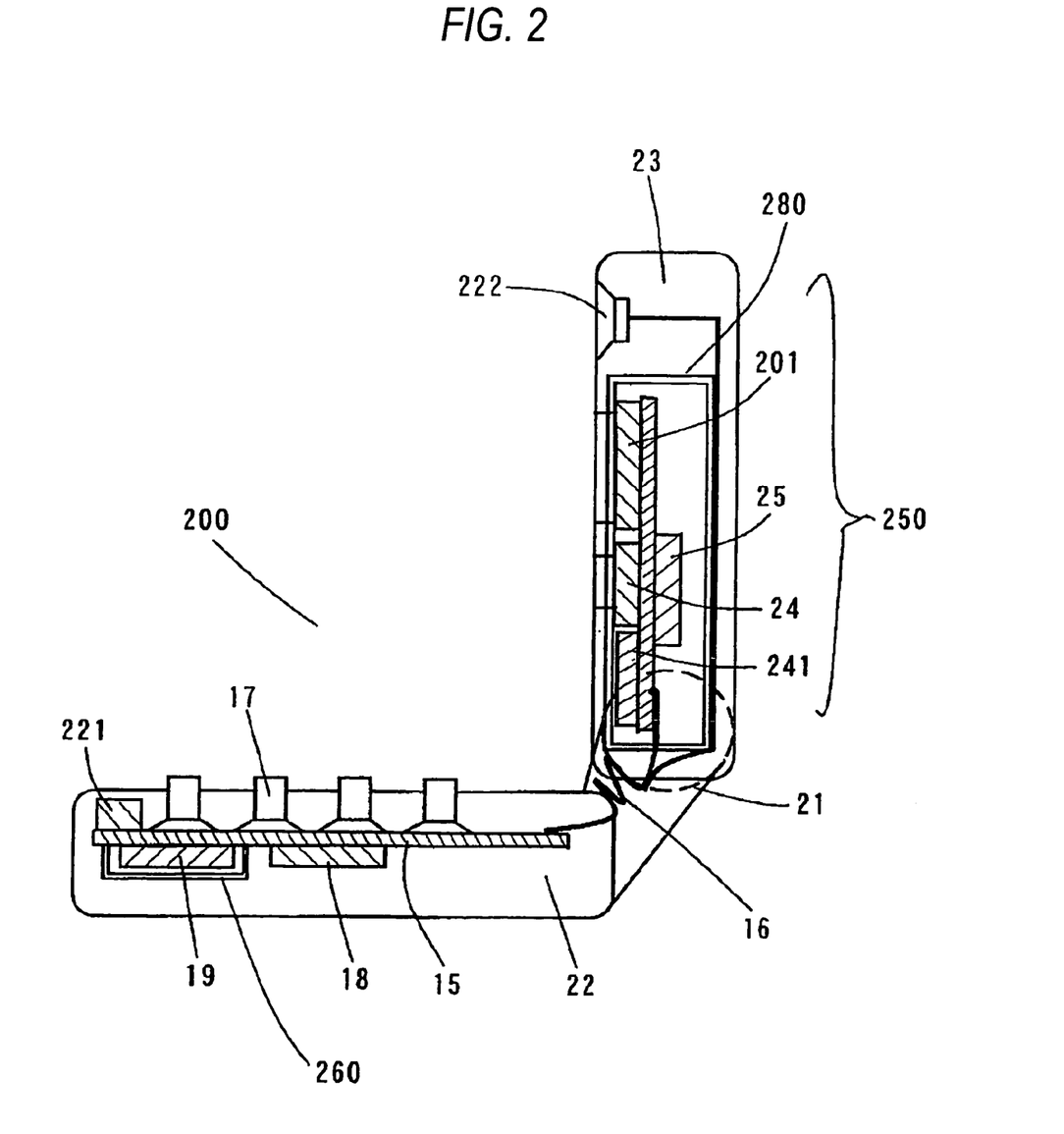
FIG. 2 is a schematic sectional view of the folding cellular phone device according to the first embodiment of the present invention.

FIG. 2 is a schematic sectional view of the folding cellular phone device 200 according to the first embodiment of the present invention. In FIG. 2, in the folding cellular phone device 200, a casing consists of the first casing 22 and the second casing 23. The hinge 21 is provided to an arm of the first casing 22, and the second casing 23 is supported to be opened/closed on the hinge 21. A main body board 15 is provided to the first casing 22. The above overall controlling unit 18, the radio communicating unit 19 consisting of the receiver portion 191, the transmitter portion 192, and the radio controlling unit 190, the microphone 221 serving as the mouthpiece, and the key operating portion 17 such as the ten key, etc. are mounted on the main body board 15. In particular, the portion of the main body board 15 on which the radio communicating unit 19 is mounted is covered with the box-type electromagnetic shielding frame member 260, on which the metallic or conductive material is coated, and sealed by the same.

In the second casing 23, the camera portion 24, the image processing controlling unit 241, the storing unit 25, and the displaying unit 201 composed of the color liquid crystal display device are covered with the electromagnetic shielding frame member 280 as one camera module 250 and are sealed by the same. Also, the receiver 222 serving as the earpiece is provided in the second casing 23. The receiver 222 and the above camera module 250 are connected to a flexible board 16 whose top ends are branched. Then, the other end of the flexible board 16 is connected to the main body board 15 in the first casing 22 and is connected to the overall controlling unit 18 on the main body board 15 or the sound processing portion 220. In this manner, the radio communicating unit 19 and the camera module 250 are shield separately by the electromagnetic shielding frame member 260 or the electromagnetic shielding frame member 280 and are incorporated into separate casings.

When the camera mode starting button (not shown) on the key operating portion 17 is pressed and thus the camera mode starting signal is input, the overall controlling unit 18 sends out the instruction signal to the image processing controlling unit 241 to start the operation in the camera mode. The image processing controlling unit 241 causes the camera portion to turn ON the power supply, causes the camera portion to pick up the image, and causes the displaying unit 201 to display the monitor image that was subjected to the image processing. Then, when the shutter button (not shown) on the key operating portion 17 is released, the image data picked up by the camera portion 24 are stored in the storing unit 25 and then the stored image is displayed as the picked-up image on the displaying unit 210. In this manner, in the operation in the camera mode, the signal being input via the key operating portion 17 is sent out to the image processing controlling unit 241 from the overall controlling unit 18 in the first casing 22, but the image data picked up by the camera portion 24 are processed in the second casing 23. Since the image data do not communicate through the flexible board 16 that connects the first casing 22 and the second casing 23, the electromagnetic wave generated in the image processing is not radiated from the flexible board 16.

Next, a measure taken to prevent the radiation of the electromagnetic wave from the flexible board 16 which connects the first casing 22 and the second casing 23, even when the folding cellular phone device 200 of the present invention is processing the image data as the operation other than the camera mode will be explained hereunder. By way of example, the operation to make the phone call by using the electronic phone book containing the image data that are stored in connection with the phone numbers will be explained hereunder.

Figure 3:
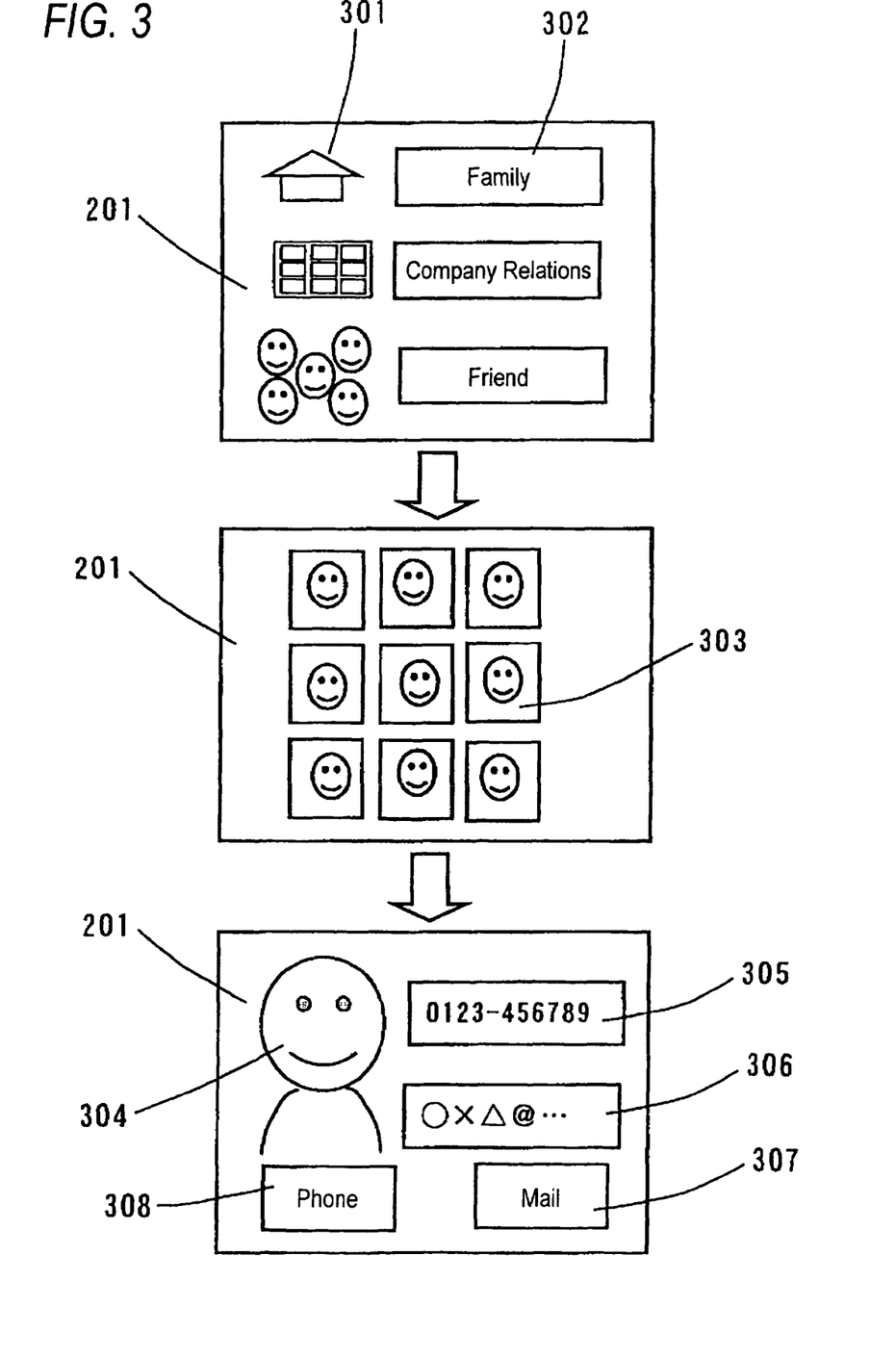
FIG. 3 is a transition diagram showing display contents on a displaying unit of the folding cellular phone device according to the first embodiment of the present invention.

FIG. 3 is a transition diagram showing display contents on the displaying unit 201 of the folding cellular phone device 200 of the present invention when the destination is searched by using the electronic phone book containing the image data and the phone call is made. First, icons 301 such as a house, a building, and the like and group names 302 such as a family, company relations, friends, and the like, for example, are displayed when the electronic phone book is opened. When the user of the folding cellular phone device 200 identifies the group via the key operating portion 17, a plurality of photos 303 of member's faces registered in the group (photos of nine persons in FIG. 3) are displayed in a thumbnail fashion as a list. When the user identifies one member by using the key operating portion 17, the photo 304 of member's face, the phone number 305, and the mail address 306 of the identified member are displayed largely. Since "phone" and "mail" are displayed at the bottom of the screen as soft keys, the call issuing operation or the mail sending operation is started by pressing the corresponding button of the key operating portion 17, or the like.

Figure 4:
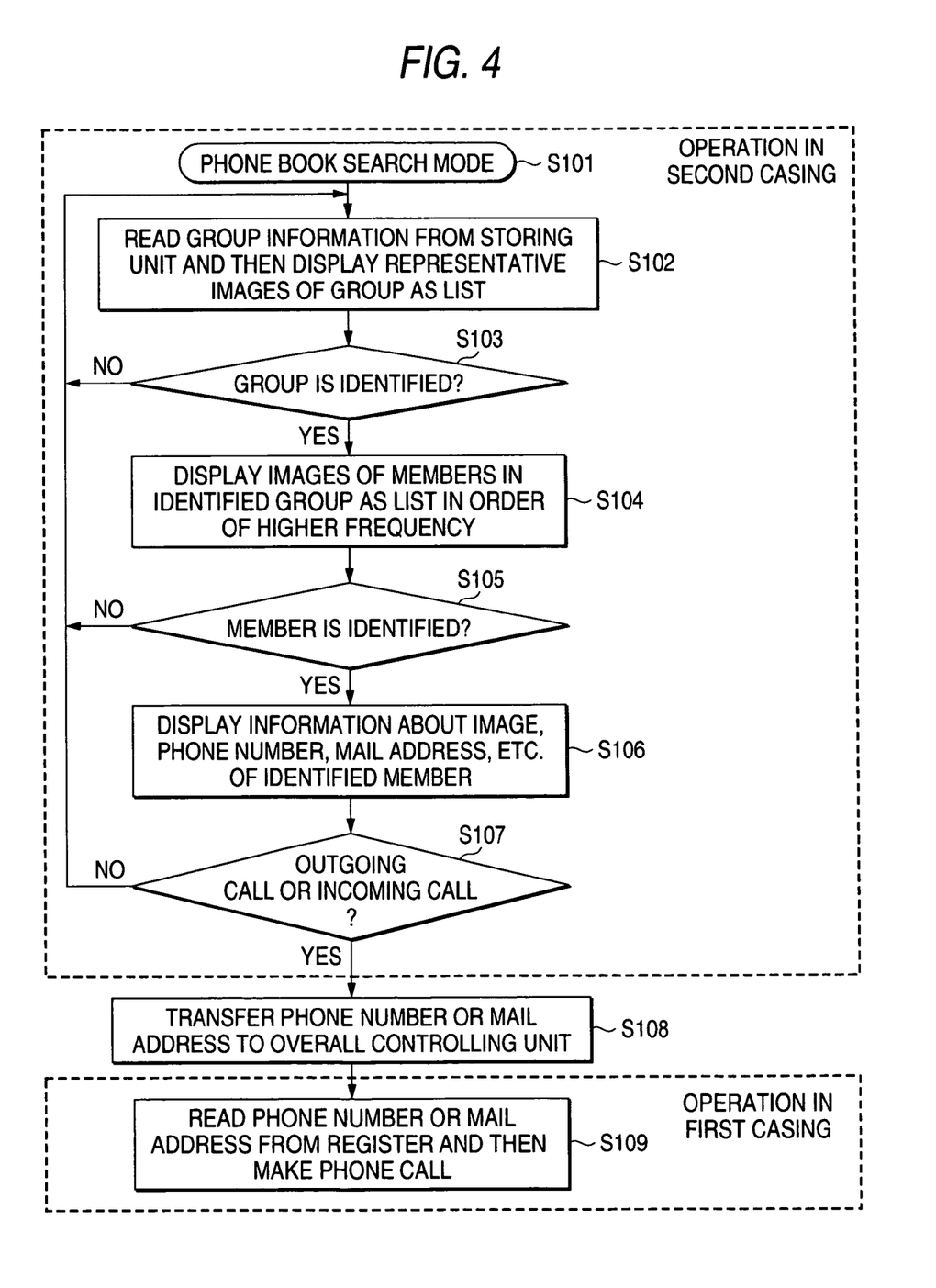
FIG. 4 is a flowchart showing control operations of the folding cellular phone device according to the first embodiment of the present invention.

The control operations taken when the phone call is made by using the electronic phone book containing the image data like the transition diagram in FIG. 3 are shown as a flowchart in FIG. 4. When the user of the folding cellular phone device 200 inputs the phone book searching mode starting signal from the key operating portion 17, the overall controlling unit 18 sends out the starting signal of the phone book search mode operation to the image processing controlling unit 241 (Step 101). The image processing controlling unit 241 reads the group information from the storing unit 25 and then displays representative images of the group as a list (Step 102). When the user identified the group via the key operating portion 17 (Step 103), the image processing controlling unit 241 sorts the members in the identified group in order of higher frequency such as a call outgoing frequency or a call incoming frequency utilized in the communication, then reads images of the members (photos of member's faces), which can be displayed as a list, from the storing unit 25 and then displays them as a list (Step 104). When the user identified the member on which the phone call is to be made via the key operating portion 17 (Step 105), the information about the image (photo of the face), the phone number, and the mail address of the identified member are displayed (Step 106). Then, a phone button and a mail button are displayed on the display screen to call upon the user to choose one of them. Then, either the call issuing operation or the mail sending operation is started. If the user inputs the call issuing or the mail sending (Step 107), the image processing controlling unit 241 transfers the phone number or the mail address from the storing unit 25 to the overall controlling unit 18 (Step 108). The overall controlling unit 18 sends out the operation indicating signal, which calls the transferred phone number or sends the mail to the phone, to the radio controlling unit 190 in response to this operation. Then, the radio controlling unit 190 is caused to make the phone call based on the call issuing indicating signal issued to the phone number. Also, the mail sending operation is started based on the mail sending indicating signal (Step 109).

Here, all the operations in step 101 to step 107 are executed in the second casing 23. Even though the image processing controlling unit 241 reads a large number of image data from the storing unit 25 and the sends out the image data to the displaying unit 201 to display-the images as a list, the image data are not output to the flexible board 16 between the first casing and the second casing. Therefore, the electromagnetic wave is never radiated from the flexible board 16.

Embodiment 2

Figure 5:
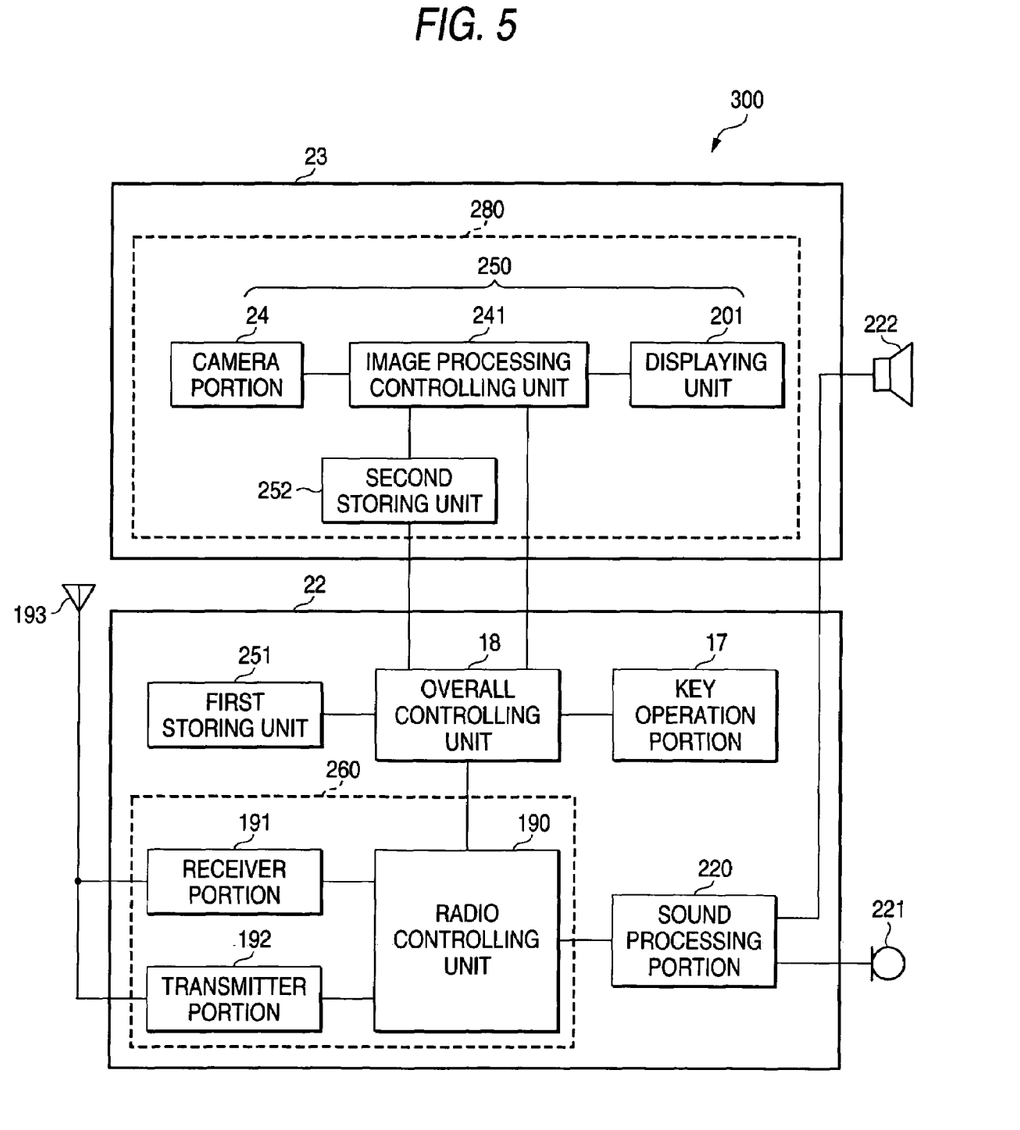
FIG. 5 is a schematic block diagram of a folding cellular phone device according to a second embodiment of the present invention.

A folding cellular phone device 300 according to a second embodiment of the present invention will be explained hereunder. FIG. 5 is a schematic block diagram of the folding cellular phone device 300 according to the second embodiment of the present invention. In FIG. 5, in the folding cellular phone device 300, a first storing unit 251 in which the image data can be stored is connected to the overall controlling unit 18. This first storing unit 251 is a memory unit to save temporarily the image data when the image data are to be transmitted/received via a radio. Then, a second storing unit 252 is provided to the second casing 23. The second storing unit 252 fulfills the same role as the storing unit 25 in the folding cellular phone device 200 according to the first embodiment of the present invention. Other configurations are similar to those in the folding cellular phone device 200 according to the first embodiment of the present invention that have already be explained in FIG. 1, and therefore their explanation will be omitted herein by affixing the same reference numerals to the same portions.

In the folding cellular phone device 300 according to the second embodiment of the present invention, the case where the image picked up by the camera portion 24 is transmitted via a radio will be explained hereunder.

Figure 6:
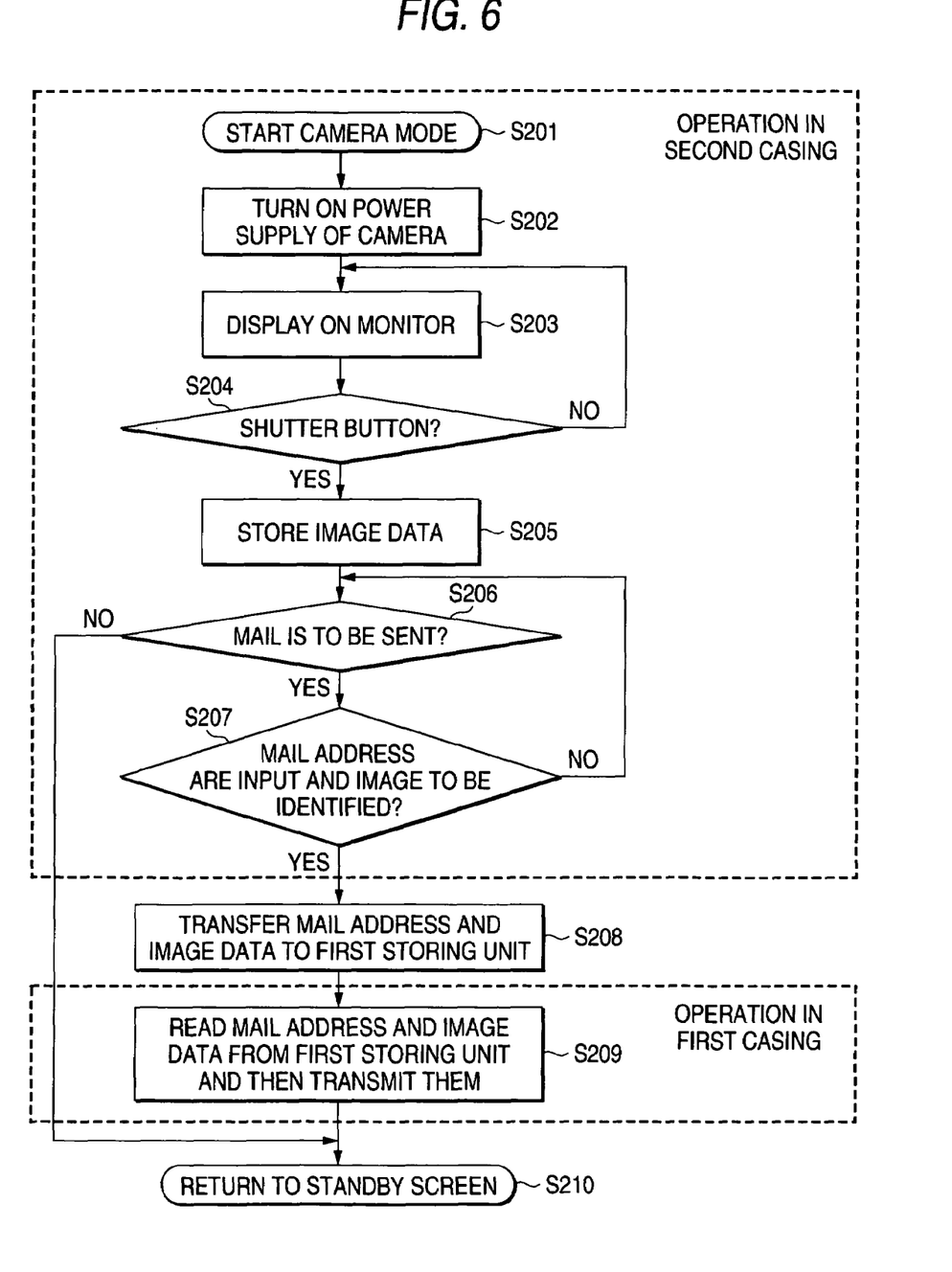
FIG. 6 is a flowchart showing control operations of the folding cellular phone device according to a second embodiment of the present invention.

The operations taken to transmit the image picked up by the camera portion 24 via a radio by using the folding cellular phone device 300 are shown as a flowchart in FIG. 6. In FIG. 6, when the user of the folding cellular phone device 300 inputs the camera mode starting signal from the key operating portion 17 (Step 201), a power supply of the camera portion 24 is turned ON (Step 202). Then, the image data picked up by the camera portion 24 are sent out to the image processing controlling unit 241 and are subjected to the image processing, and then monitor-displayed on the displaying unit 201 as a moving picture (Step 203). When the shutter button on the key operating portion 17 is pressed during the monitor display (Step 204), the image data captured when the button is pressed are stored in the second storing unit 252 (Step 205). Then, the picked-up image is displayed on the displaying unit 201, and also the mail button is displayed on the image to decide whether or not the mail should be sent. When the user of the folding cellular phone device 300 selected the mail sending (Step 206), the mail address input screen is displayed on the displaying unit, and then the device waits as it is until the image to be sent is identified among the picked-up images (Step 207). When the mail address and the to-be-sent image of the destination are identified, the overall controlling unit 18 acquires intermittent receiving timings from the radio controlling unit 190, and then transfers the mail address and the to-be-sent image from the second storing unit 252 to the first storing unit 251 at the timing out of the timings at which the control signal is received intermittently from the base station, in other words, at the timings at which the radio communication is not operated (Step 208). After this transfer, the overall controlling unit 18 sends out the indicating signal to the radio controlling unit 190 to send the image data via the mail. The radio controlling unit 190 reads the mail address and the to-be-sent image from the first storing unit 251 and then transmits them (Step 209). When the mail sensing is ended, the display unit returns to the standby screen to receive the call (Step 210).

Here, the image data processing such as camera mode start, monitor display, image shooting, image storing in step 201 to step 207 are executed in the second casing 23. Therefore, the image data are never output to the flexible board 16 between the first casing 22 and the second casing 23 and thus the electromagnetic wave is never radiated from the flexible board 16.

Also, the transfer of the image data from the second storing unit 252 to the first storing unit 251 is executed at the timings except the intermittent receiving timings of the control signal from the base station. Therefore, even though the electromagnetic wave is generated from the flexible board, the radio communicating unit 19 is not affected by such electromagnetic wave. Since the image data are transmitted after the image data are captured on the first storing unit 251 in the first casing 22, the image data can be sent via the mail without the influence of the electromagnetic wave caused in handling the image data.

In this case, when the image data are also received from other cellular phone device, the data are stored vain a stream from the antenna 193, the receiver portion 191, the radio controlling unit 190, the overall controlling unit 18, and the first storing unit 251 and then transferred to the second storing unit 252 at the timings at which the radio communication is not carried out. Therefore, the generation of the electromagnetic wave from the flexible board 16 that connects the first casing 22 and the second casing 23 can be prevented.

Here, particular explanation to identify either the CCD camera or the CMOS camera as the camera portion is not given. The CCD camera has a consumption power, and there are such advantages that the overall device can be downsized if such camera is formed together with the image processing controlling unit, and the like. However, the type of the camera portion in the present invention is not particularly limited if such camera has an imaging function.

The present invention is explained in detail with reference to particular embodiments. But it is apparent for the person skilled in the art that various variations and modifications may be applied without departing from the spirit and scope of the present invention.

This application was made based on Japanese Patent Application No.2002-370356 filed on Dec. 20, 2002, and its contents are incorporated herein by the reference.

INDUSTRIAL APPLICABILITY

As described above, according to the present invention, the radio communicating unit and the overall controlling unit are provided to the first casing, and the camera portion, the image processing controlling unit, the displaying unit, and the storing unit are provided to the second casing, and the image data picked up by the camera portion are processed by the image processing controlling unit.

According to this, there can be achieved such an advantage that, even though the image data are being processed, such image data never communicate between the first casing and the second casing and thus the electromagnetic wave is never radiated from the flexible board that connects the first casing and the second casing.

Also, the first storing unit is provided to the first casing, the second storing unit is provided to the second casing, the data necessary for the radio communication are transferred between the first storing unit and the second storing unit when the radio communication is not carried out, and the radio communication is executed by reading the necessary data from the first storing unit when the radio communication is carried out.

According to this, there can be achieved such an advantage that, even though the radio communication with the image data is being executed, such image data never communicate between the first casing and the second casing and thus the electromagnetic wave is never radiated from the flexible board that connects the first casing and the second casing.

The invention claimed is:

1. A folding cellular phone device, comprising:

a first casing; and a second casing, which is supported on the first casing so as to be opened/closed, wherein a radio communicating unit and an overall controlling unit are provided in the first casing;

wherein a camera portion, an image processing controlling unit, a displaying unit, and a storing unit are provided in the second casing;

wherein the image processing controlling unit and the storing unit are connected to the overall controlling unit;

wherein the camera portion, the displaying unit, and the storing unit are connected to the image processing controlling unit; and wherein the image processing controlling unit processes image data which is picked up by the camera portion.

2. A folding cellular phone device, comprising:

a first casing; and a second casing, which is supported on the first casing so as to be opened/closed, wherein a radio communicating unit, an overall controlling unit, and a first storing unit are provided in the first casing;

wherein a camera portion, an image processing controlling unit, a displaying unit, and a second storing unit are provided in the second casing;

wherein the image processing controlling unit, the first storing unit, and the second storing unit are connected to the overall controlling unit;

wherein the camera portion, the displaying unit, and the second storing unit are connected to the image processing controlling unit; and wherein the image processing controlling unit processes image data which is picked up by the camera portion.

3. The folding cellular phone device as set forth in claim 2, wherein data necessary for a radio communication is transferred between the first storing unit and the second storing unit when the radio communication is not carried out; and wherein the radio communication is executed by reading necessary data from the first storing unit when the radio communication is carried out.

* * * * *